W. T. CURTIS.
APPARATUS FOR FILLING VESSELS WITH LIQUIDS.
APPLICATION FILED NOV. 22, 1907.
933,892.
Patented Sept. 14, 1909.
4 SHEETS—SHEET 2.
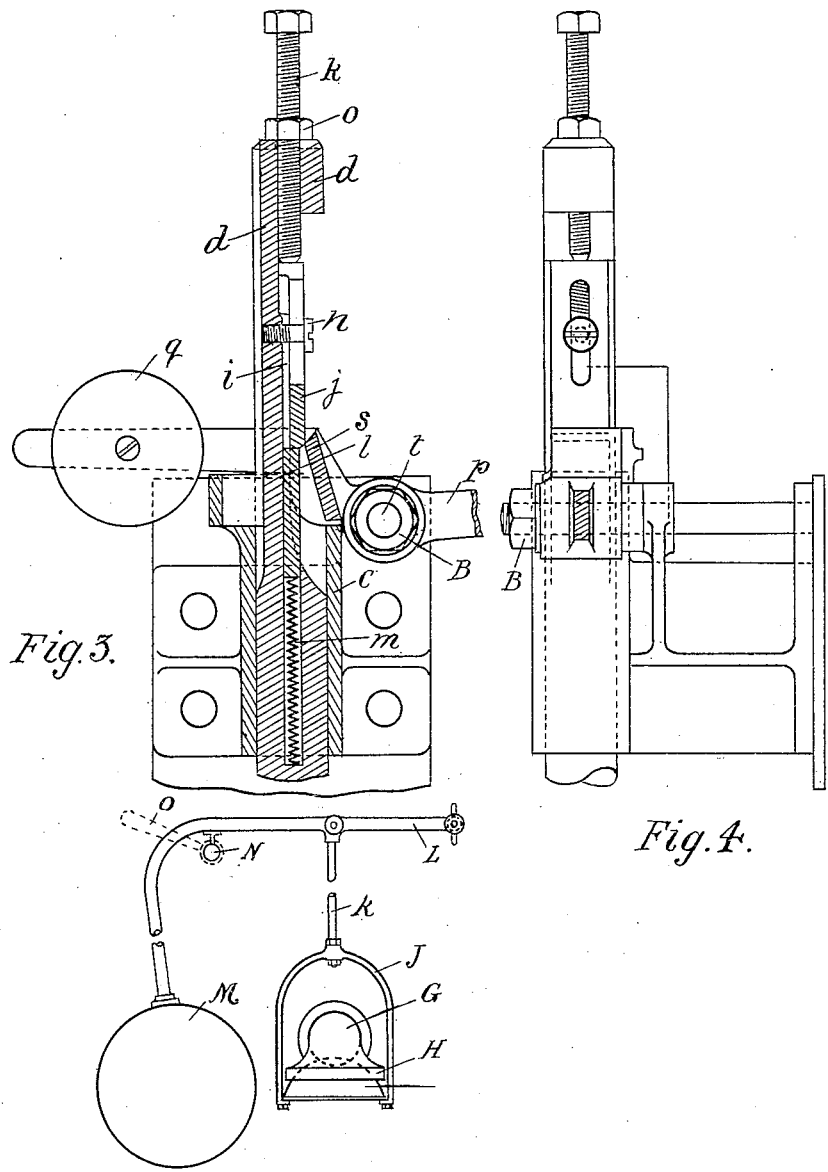
Witnesses.
George Newbery.
John Jones
Inventor.
W. T. Curtis
per T. E. Halford
Attorney.

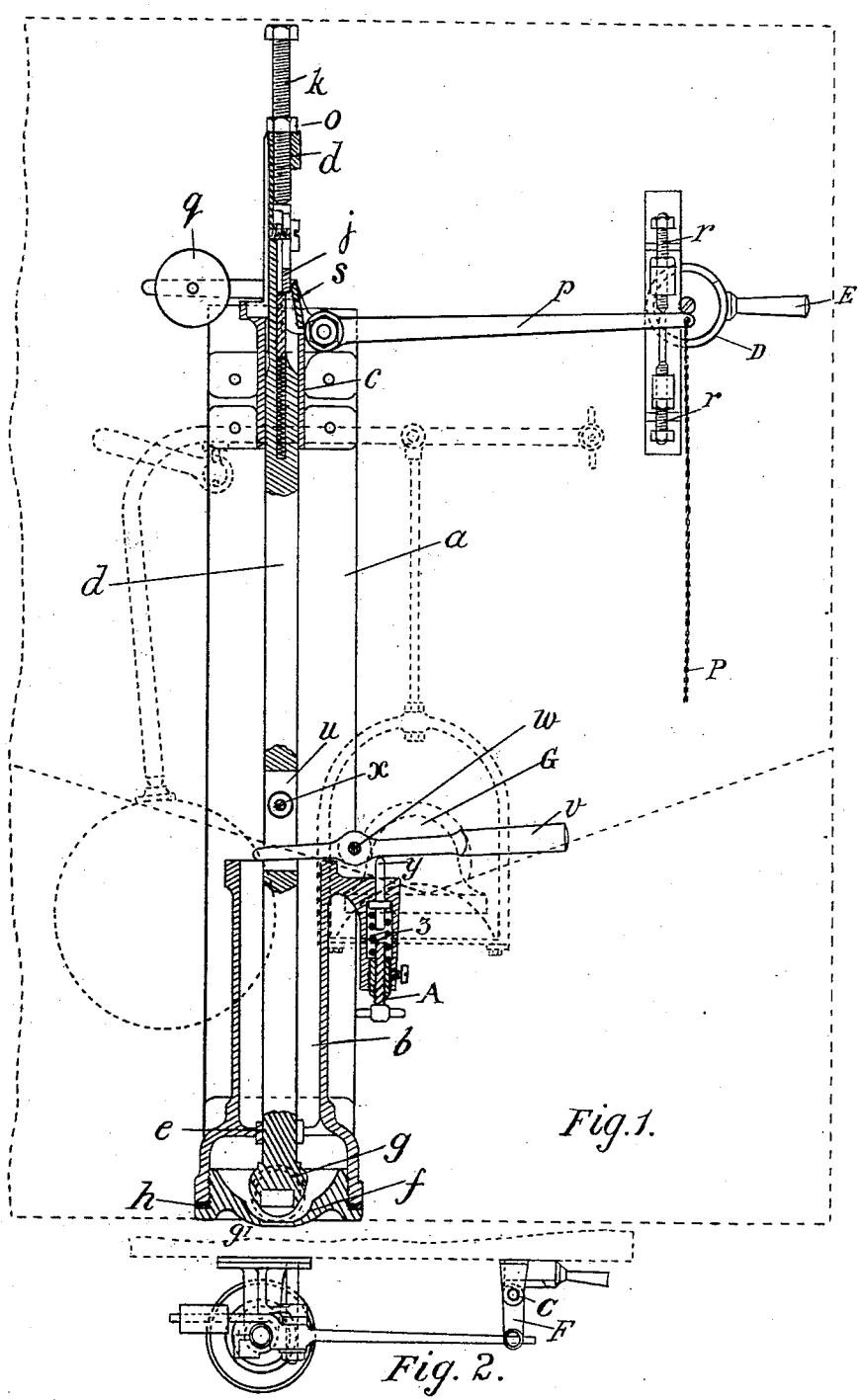

W. T. CURTIS.
APPARATUS FOR FILLING VESSELS WITH LIQUIDS.
APPLICATION FILED NOV. 22, 1907.

933,892.

Patented Sept. 14, 1909.
4 SHEETS—SHEET 3.

Witnesses.

Inventor.
W. T. Curtis
per T. E. Halford
Attorney

W. T. CURTIS.
APPARATUS FOR FILLING VESSELS WITH LIQUIDS.
APPLICATION FILED NOV. 22, 1907.

933,892.

Patented Sept. 14, 1909.
4 SHEETS—SHEET 4.

Witnesses.
George Newberg
John Smith

Inventor
W. T. Curtis
per T. E. Halford
attorney

UNITED STATES PATENT OFFICE.

WILLIAM THOMAS CURTIS, OF BATTERSEA, LONDON, ENGLAND.

APPARATUS FOR FILLING VESSELS WITH LIQUID.

933,892.  Specification of Letters Patent.  Patented Sept. 14, 1909.

Application filed November 22, 1907. Serial No. 403,410.

*To all whom it may concern:*

Be it known that I, WILLIAM THOMAS CURTIS, a subject of the King of Great Britain, residing at 119 and 121 York road, Battersea, London, S. W., England, have invented a new and useful apparatus for filling vessels with liquids in such quantities as may be desired, in which the mechanism, acting in conjunction with ordinary scales, automatically shuts off the supply of liquid on the desired weight being delivered from the container. This is accomplished by means of the mechanism illustrated in the accompanying drawings, in which—

Figure 6:
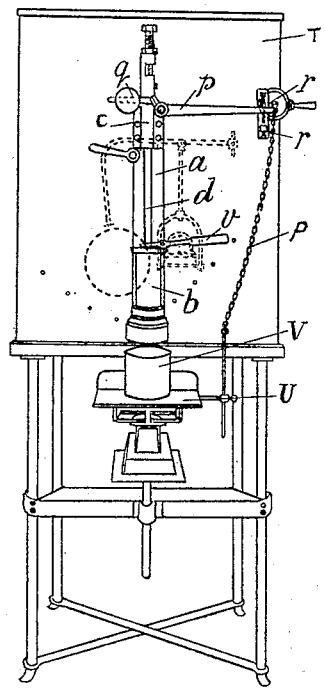
Figure 7:
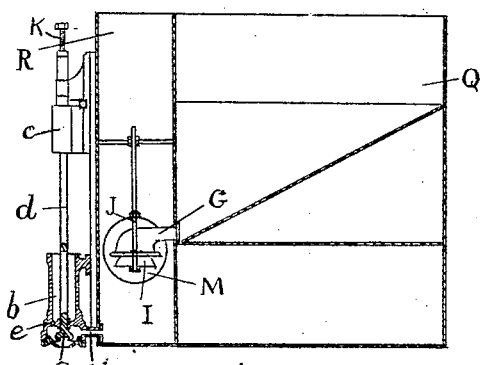
Figures 8, 9:
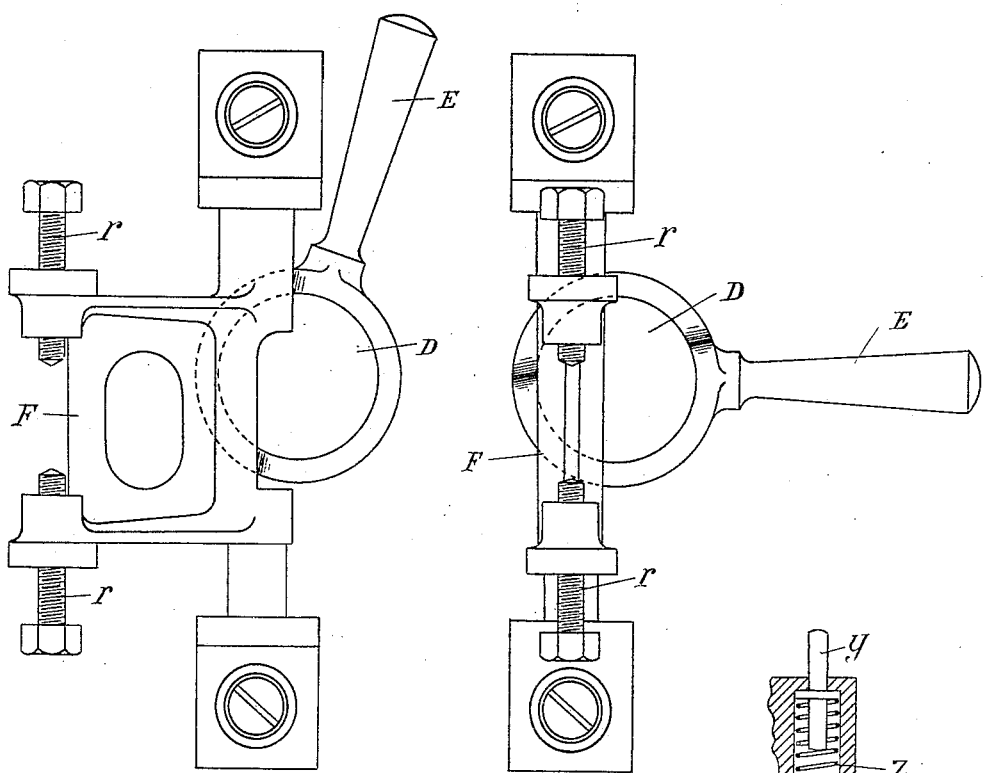
Figure 12:
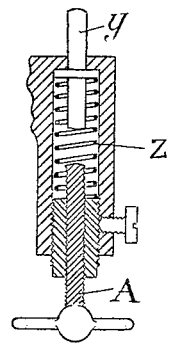
Figure 10:
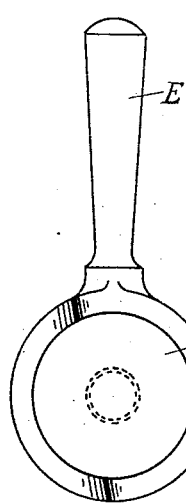
Figure 11:
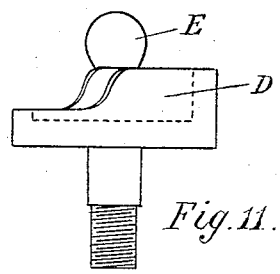

Figure 1 represents an elevation partly in section of the filling and cut-off mechanism. Fig. 2 is a plan of the same on a reduced scale. Fig. 3 is section through the tripping gear to an enlarged scale. Fig. 4 is end view of same. Fig. 5 is elevation of mechanism for regulating the flow of liquid from the container to the valve. Fig. 6 is front view of the apparatus complete. Fig. 7 is section of a slightly modified form of container. Figs. 8 and 9 show the apparatus for regulating the movement of the tripping lever. Fig. 10 is a plan of the cam. Fig. 11 is side view of same. Fig. 12 is a view, partly in section of the mechanism for regulating the fall of the cut-off valve.

Now according to this invention I provide a vertical standard $a$ having a valve chamber or receptacle $b$ for liquid at the bottom thereof, and a bored guide $c$ for the valve rod $d$ at the top thereof. The valve chamber $b$ is preferably cylindrical and is open at the top.

At the lower end of the valve chamber $b$ is a guide $e$ for the valve rod $d$ which is made integral with the receptacle $b$ as shown in Fig. 7 or attached to said receptacle as shown in Fig. 1.

$h$ is a packing ring to make a stanch joint between the valve seat $f$ and the bottom of the valve chamber $b$.

The valve $g$ is recessed at $g'$ to prevent dripping.

The upper end of the valve rod $d$ is cut away at $i$ to receive the trip piece $j$ which is moved downward by a screw $k$. The trip piece $j$ rests on a plunger $l$ which in its turn rests on a coiled spring $m$ which raises the trip piece $j$ when the screw $k$ is slackened.

$n$ is a screw to secure the trip piece $j$ to the rod $d$ and $o$ is a lock-nut to prevent rotation of the screw $k$.

$p$ is a lever carrying a weight $q$ to balance the weight of the lever $p$, the said lever being pivoted at $t$ to the standard $d$. The long arm of the lever $p$ moves between screws $r\ r$ which serve to limit the movement of the said lever when once the distance between the screws $r\ r$ has been properly adjusted.

The lever $p$ is provided with a trip piece $s$ which engages with the trip piece $j$ when the valve $g$ is raised to allow the liquid to flow from the tank or other receptacle to the vessels to be filled. The trip pieces $j$ and $s$ are formed as arcs of circles struck from the pivot $t$ as a radius to reduce friction between the trip pieces to a minimum when the lever $p$ falls and releases the valve $g$.

The valve rod $d$ is slotted at $u$ to receive the short arm of the lever $v$ which is pivoted at $w$ to the valve chamber $b$ or to the standard, $a$, an anti-friction roller $x$ being fitted in the said slot against which the short arm of the lever $v$ bears when raising the valve $g$.

To avoid unnecessary delay when changing vessels and to avoid shock and undue wear of the trip pieces when raising the valve $g$, I provide a plunger $y$ normally pressed upward by a spring $z$ which maintains the lever $v$ in the position shown by Fig. 1 to allow the valve to fall freely. The downward movement of the long arm of the lever $v$ is regulated by the screw A in order that the valve rod shall only be raised sufficiently to allow the trip pieces $j$ and $s$ to engage with each other without shock, that is to say when the valve rod $d$ is raised to the fullest extent allowable by the compression of the spring $z$, the trip piece $j$ engages with the trip piece $s$ and is sustained thereby, without any back-lash, on the operator releasing the handle $v$.

When the apparatus has to be cleaned, for instance when it has been used for filling paint tins with, say blue paint, the whole apparatus may be dismantled by unscrewing the valve seat $f$ and removing the nut B, the piece F which supports the screws r r being hinged at C; and on rotating the cam D by means of the handle E in one direction the piece F may be folded down so as to allow the lever p to be removed. On re-assembling the cam D is rotated in the opposite direction and restores the piece F to the position shown by Figs. 1, 2 and 9.

The apparatus is secured to a tank or container T consisting of two compartments, viz. a receptacle Q to receive the liquid in bulk, and a small receiver R communicating with the receptacle Q by means of a ball valve to insure the liquid being delivered into the vessels under a constant head, the receiver R also communicates with the valve chamber b by means of the aperture b'. I prefer to construct this portion of the apparatus as shown by Figs. 1 and 5; the receptacle being formed with a bottom sloping on all sides to the pipe G which is provided with a bell-mouth H forming a valve seating.

The valve I is hemispherical and is supported by a stirrup J and rod K from the lever L to which is attached a ball or float M.

I provide also an eccentric N which may be rotated by the lever O to raise the lever L and close the valve I. This arrangement enables the supply of liquid to be cut off from the valve chamber b when the apparatus is being re-set, for example when changing from 1 lb. tins of paint to 2 lb. tins it is necessary to give the valve g more lift than was required to fill the smaller tins, in order to fill the larger tins rapidly, consequently the position of the trip piece j and the movement of the lever v have to be varied. By closing the valve I by means of the eccentric N the paint is prevented from flowing into the small front receiver while the alterations to the valve are in progress.

P is a light chain or cord which is attached at one end to the scale pan which contains the vessel to be filled with liquid.

The valve g may be removed for cleaning the apparatus when changing from one liquid to another, by removing the bolt x and nut B, and by rotating the cam D. The rotation of the cam D in one direction releases the bracket F which may then be folded against the container allowing the lever p to be removed from its pivot t. The valve seat f is then unscrewed from the valve chamber and the valve g withdrawn. After cleaning the valve and seating are replaced and the levers v and p restored to their respective pivots. On turning the cam D to its original position, the bracket F is turned into the position shown by Fig. 2.

The action of the apparatus is as follows:—
The vessel to be filled is placed on the scale pan U immediately under the valve chamber, the valve is then raised by the lever v and held open by the trip pieces j and s. As soon as the vessel contains the required weight of liquid the scale pan on which it rests, falls, and by means of the chain or cord P depresses the long arm of the lever p, the movement of this lever moves the trip piece s from under the trip piece j, the valve g being now unsupported, falls by gravity and cuts off the supply of liquid to the vessel. The vessel is next removed, a fresh one substituted and the valve raised, and the operation of filling resumed.

I claim—

1. In an apparatus for filling vessels with liquids the combination of a tank divided into two compartments of unequal size a pipe connecting said compartments together, a float valve located in the smaller compartment, a vertical standard on the outside of the tank, a valve chamber at the bottom of said standard, a pipe connecting said valve chamber with the bottom of the smaller compartment of the tank, a valve located in said chamber, means for opening the valve, means for holding the valve open and means for automatically releasing said holding means and permitting said valve to close when the vessel is filled, all as specified and for the purpose stated.

2. In an apparatus for filling vessels with liquids the combination of a tank divided into two compartments of unequal size a pipe connecting said compartments together, a float valve located in the smaller compartment, a vertical standard on the outside of the tank, a valve chamber at the bottom of said standard, a pipe connecting said valve chamber with the bottom of the smaller compartment of the tank, a valve located in said valve chamber, means for opening the valve a tripping device carried by said standard and adapted to allow the valve in the valve chamber to fall when the vessel is filled, a scale pan to receive the vessel to be filled and means for actuating the tripping device when the scale pan bearing the filled vessel falls, as specified.

3. In an apparatus for filling vessels with liquids the valve g having a rod d secured thereto, an adjustable trip piece j at the upper end of said rod, a plunger l located in said valve rod a spring m in the valve rod below said plunger and a screw k to move the trip piece j downward, as specified and for the purpose stated.

4. In an apparatus for filling vessels with liquids the combination of a tank divided into two compartments of unequal size a pipe connecting said compartments together, a float valve located in the smaller compartment, a vertical standard on the outside of the tank, a valve chamber at the bottom of the said standard, a pipe connecting said valve chamber with the smaller compartment of the tank, a valve and valve rod movable vertically in said chamber, a guide for the valve rod above the chamber, an adjustable trip piece at the upper end of the valve rod, a balanced lever pivoted to the valve rod guide, a trip piece secured to said lever to engage with and support the trip piece attached to the valve rod, means for regulating the movement of the said lever, a scale pan, and means for raising the valve and rod and means for connecting the said lever to the scale pan, all as specified and for the purpose stated.

WILLIAM THOMAS CURTIS.

Witnesses:
T. E. HALFORD,
G. NEWBERY.